(12) United States Patent
Zhou

(10) Patent No.: US 11,448,922 B2
(45) Date of Patent: Sep. 20, 2022

(54) POLYMER STABILIZED VERTICAL ALIGNMENT LIQUID CRYSTAL DISPLAY PANEL AND METHOD OF MANUFACTURING SAME

(71) Applicant: TCL China Star Optoelectronics Technology Co., Ltd., Guangdong (CN)

(72) Inventor: Shixin Zhou, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 262 days.

(21) Appl. No.: 16/617,157

(22) PCT Filed: Jul. 15, 2019

(86) PCT No.: PCT/CN2019/095924
§ 371 (c)(1),
(2) Date: Nov. 26, 2019

(87) PCT Pub. No.: WO2020/215498
PCT Pub. Date: Oct. 29, 2020

(65) Prior Publication Data
US 2021/0333586 A1    Oct. 28, 2021

(30) Foreign Application Priority Data

Apr. 24, 2019 (CN) .......................... 201910333080.5

(51) Int. Cl.
*G02F 1/1339* (2006.01)
*G02F 1/137* (2006.01)
(Continued)

(52) U.S. Cl.
CPC .......... *G02F 1/1339* (2013.01); *C09J 133/04* (2013.01); *C09J 163/00* (2013.01); *C09K 19/542* (2013.01);
(Continued)

(58) Field of Classification Search
CPC .. G02F 1/1339; G02F 1/13775; G02F 1/1341; C09K 19/54–544;
(Continued)

(56) References Cited

U.S. PATENT DOCUMENTS

2016/0244667 A1* 8/2016 Ono ...................... C09K 19/20
2017/0363891 A1* 12/2017 Miyachi ................ C09K 19/30
(Continued)

FOREIGN PATENT DOCUMENTS

CN        109946883 B  * 10/2020    ........... G02F 1/1339

*Primary Examiner* — Sophie Hon
(74) *Attorney, Agent, or Firm* — Taft Stettinius & Hollister LLP

(57) ABSTRACT

A polymer stabilized vertical alignment liquid crystal display (PS-VA LCD) panel and a method of manufacturing same. The PS-VA LCD panel includes a first substrate; a second substrate; a crystal layer disposed between the first substrate and the second substrate; a plurality of vesicles disposed around the crystal layer, wherein the vesicles includes a plurality of free radical inhibitors; and a sealant using for encapsulating the liquid crystal layer between the first substrate and the second substrate.

11 Claims, 2 Drawing Sheets

(51) Int. Cl.
  *G02F 1/1337* (2006.01)
  *G02F 1/1333* (2006.01)
  *C09J 133/04* (2006.01)
  *C09J 163/00* (2006.01)
  *C09K 19/54* (2006.01)
  *G02F 1/1335* (2006.01)
  *G02F 1/1341* (2006.01)
  *G02F 1/1343* (2006.01)

(52) U.S. Cl.
  CPC ........ *G02F 1/1341* (2013.01); *G02F 1/13439* (2013.01); *G02F 1/13775* (2021.01); *G02F 1/133302* (2021.01); *G02F 1/133528* (2013.01); *G02F 1/133742* (2021.01); *C09K 2019/548* (2013.01); *C09K 2323/055* (2020.08); *C09K 2323/057* (2020.08)

(58) Field of Classification Search
  CPC ........ C09K 2019/548; C09K 2323/055; C09K 2323/057; C09J 163/00; C09J 133/04
  See application file for complete search history.

(56) References Cited

U.S. PATENT DOCUMENTS

| | | | |
|---|---|---|---|
| 2019/0072792 A1* | 3/2019 | Chen | G02F 1/133528 |
| 2019/0184022 A1* | 6/2019 | Floreancig | C01B 35/10 |
| 2020/0247916 A1* | 8/2020 | Kirsch | C08F 2/46 |

\* cited by examiner

POLYMER STABILIZED VERTICAL ALIGNMENT LIQUID CRYSTAL DISPLAY PANEL AND METHOD OF MANUFACTURING SAME

CROSS-REFERENCE TO RELATED APPLICATIONS

This application is a U.S. National Phase of International PCT Application No. PCT/CN2019/095924 filed Jul. 15, 2019, which claims the benefit of Chinese Patent Application Serial No. 201910333080.5 filed Apr. 24, 2019, the contents of each application are incorporated herein by reference in their entirety.

FIELD OF INVENTION

The present disclosure relates to a field of display and, more particularly, relates to a polymer stabilized vertical alignment liquid crystal display panel and a method of manufacturing same.

BACKGROUND OF INVENTION

Polymer stabilized vertical alignment (PS-VA) is a technology of thin film transistor (TFT) displays. In process of manufacturing a PS-VA cell, a sealant is used to encapsulate liquid crystals, preventing liquid crystals from overflow and moisture, ensuring thickness at a periphery of the cell, and fixing an array substrate with a color filter together. Material of the sealant are resin and some additives such as a thermal hardener, an ultraviolet initiator, and a silane coupling agent. A heat-curing resin and an ultraviolet-curing resin are usually used in current TFT displays simultaneously. The heat-curing resin mainly participates in ring-opening polymerization of epoxy resins, and the ultraviolet-curing resin mainly participates in radical polymerization of acrylic acid.

An ultraviolet-curing process is performed after an array substrate and a color filter are combined to form a cell. Ultraviolet light is not able to penetrate a sealant at the periphery of the cell, but it can cure a surface of the sealant. After that, a heat-curing process is performed at about 120 degrees Celsius. However, in some cases, a sealant cannot be completely cured because of blockage of wirings, which leads to precipitation of ultraviolet inhibitors at the periphery of the cell, and results in polymerization of reaction monomers to form copolymers. A pretilt angle of liquid crystals will be abnormal in a location where the copolymers are formed, thereby leading to uneven brightness of the location, which is generally called "Mura" (uneven brightness at a periphery of a display device). As shown in FIG. 1, reference numeral 1 denotes a polyimide (PI) substrate, reference numeral 2 denotes a liquid crystal, reference numeral 3 denotes a sealant, reference numeral 4 denotes a reaction monomer, reference numeral 5 denotes precipitating ultraviolet inhibitors, and numeral 6 denotes a copolymer.

In summary, anti-pollution performance plays a vital role in a sealant. Based on long-term experience, the anti-pollution performance of the sealant can be improved by extending ultraviolet curing time, increasing the amount of ultraviolet light, adding high-refractive material to the sealant to increase or extend an optical path in the sealant, and using different types of ultraviolet inhibitors. However, the above methods cannot effectively solve a problem that an uncured sealant pollutes liquid crystals.

Regarding the technical problems: a sealant cannot be completely cured because of blockage of wirings, which leads to precipitation of ultraviolet inhibitors at a periphery of a cell, and results in polymerization of reaction monomers to form copolymers. A pretilt angle of liquid crystals will be abnormal in a location where the copolymers are formed, thereby leading to uneven brightness of the location.

SUMMARY OF INVENTION

To solve the above technical problem, the present disclosure provides a polymer stabilized vertical alignment liquid crystal display panel and a method of manufacturing same.

A polymer stabilized vertical alignment liquid crystal display (PS-VA LCD) panel, including: a first substrate; a second substrate; a liquid crystal layer disposed between the first substrate and the second substrate; a plurality of vesicles disposed around the liquid crystal layer, wherein each of the vesicles includes a plurality of free radical inhibitors; and a sealant for encapsulating the liquid crystal layer between the first substrate and the second substrate. The liquid crystal layer includes a plurality of liquid crystals and a plurality of reaction monomers polymerizable when irradiated with ultraviolet light. The sealant includes an epoxy resin, a thermal hardener, an acrylate resin for ultraviolet curing, an ultraviolet initiator, filler, and a silane coupling agent. The PS-VA LCD panel further includes a bottom polarizer, a glass substrate, a retaining wall for blocking the sealant, an indium tin oxide (ITO) layer; and a top polarizer. The vesicles containing the plurality of free radical inhibitors are a plurality of temperature-responsive assembly vesicles.

According to the PS-VA LCD panel provided by an embodiment of the present disclosure, the temperature-responsive assembly vesicles are different types of temperature-responsive assembly vesicles including at least one of N-isopropyl acrylamide, polyethylene oxide-g-1-Ethoxyethoxy-2,3-allyl glycidyl ether (PEOGMA-EE), or polyethylene oxide-g-maleic anhydride (PEOGMA-MA).

According to the PS-VA LCD panel provided by an embodiment of the present disclosure, the temperature-responsive assembly vesicles containing the plurality of free radical inhibitors disintegrate at temperatures ranging from 40 to 150 degrees Celsius.

According to the PS-VA LCD panel provided by an embodiment of the present disclosure, the free radical inhibitors contained in the temperature-responsive assembly vesicles containing the plurality of free radical inhibitors are a certain type type of free radical inhibitor with a certain concentration.

According to the PS-VA LCD panel provided by an embodiment of the present disclosure, the free radical inhibitors include at least one of 2,6-di-tert-butyl-4-methylphenol or tetramethylpiperidine oxynitride.

According to the PS-VA LCD panel provided by an embodiment of the present disclosure, the vesicles containing the plurality of free radical inhibitors are mixed with the liquid crystals of the liquid crystal layer to form liquid suspensions.

According to the PS-VA LCD panel provided by an embodiment of the present disclosure, a weight ratio of the vesicles containing the plurality of free radical inhibitors to the liquid crystal layer is constant.

An embodiment of the present disclosure further provides a polymer stabilized vertical alignment liquid crystal display (PS-VA LCD) panel, including: a first substrate; a second substrate; a liquid crystal layer disposed between the first substrate and the second substrate; a plurality of vesicles disposed around the liquid crystal layer, wherein each of the vesicles includes a plurality of free radical inhibitors; and a sealant for encapsulating the liquid crystal layer between the first substrate and the second substrate. The liquid crystal layer includes a plurality of liquid crystals and a plurality of reaction monomers polymerizable when irradiated with ultraviolet light. The sealant includes an epoxy resin, a thermal hardener, an acrylate resin for ultraviolet curing, an ultraviolet initiator, filler, and a silane coupling agent.

According to the PS-VA LCD panel provided by an embodiment of the present disclosure, the PS-VA LCD panel further includes a bottom polarizer, a glass substrate, a retaining wall for blocking the sealant, an indium tin oxide (ITO) layer, and a top polarizer.

According to the PS-VA LCD panel provided by an embodiment of the present disclosure, the vesicles containing the plurality of free radical inhibitors are temperature-responsive assembly vesicles.

According to the PS-VA LCD panel provided by an embodiment of the present disclosure, the temperature-responsive assembly vesicles are different types of temperature-responsive assembly vesicles including at least one of N-isopropyl acrylamide, PEOGMA-EE, or PEOGMA-MA.

According to the PS-VA LCD panel provided by an embodiment of the present disclosure, the temperature-responsive assembly vesicles containing the plurality of free radical inhibitors disintegrate at temperatures ranging from 40 to 150 degrees Celsius.

According to the PS-VA LCD panel provided by an embodiment of the present disclosure, the free radical inhibitors contained in the temperature-responsive assembly vesicles containing the plurality of free radical inhibitors are a certain type type of free radical inhibitor with a certain concentration.

According to the PS-VA LCD panel provided by an embodiment of the present disclosure, the free radical inhibitors comprise at least one of 2,6-di-tert-butyl-4-methylphenol or tetramethylpiperidine oxynitride.

According to the PS-VA LCD panel provided by an embodiment of the present disclosure, the vesicles containing the plurality of free radical inhibitors are mixed with the liquid crystals of the liquid crystal layer to form liquid suspensions.

According to the PS-VA LCD panel provided by an embodiment of the present disclosure, a weight ratio of the vesicles containing the plurality of free radical inhibitors to the liquid crystal layer is constant.

A method of manufacturing a polymer stabilized vertical alignment liquid crystal display (PS-VA LCD) panel, including a plurality of steps of: providing a first substrate, a second substrate, and then injecting a plurality of liquid crystals between the first substrate and the second substrate; coating a sealant on two edges of a liquid crystal layer; evenly mixing the liquid crystals and a plurality of vesicles containing a plurality of free radical inhibitors with a certain concentration and type in a dropping machine to form a mixing solution, and then evenly dropping the mixing solution around the first substrate and the second substrate; heating the sealant to 120 degrees Celsius to disintegrate the vesicles to release free radical inhibitors; and encapsulating the first substrate and the second substrate.

Regarding the beneficial effects: in some cases, a sealant cannot be completely cured because of blockage of wirings, which leads to precipitation ultraviolet inhibitors at a periphery of a cell, and results in polymerization of reaction monomers to form copolymers. A pretilt angle of liquid crystals will be abnormal in a location where the copolymers are formed, thereby leading to uneven brightness of the location. A polymer stabilized vertical alignment liquid crystal display (PS-VA LCD) panel provided by the present disclosure can solve the above problems by adding vesicles, which contain a plurality of radical inhibitors, into a liquid crystal layer.

DETAILED DESCRIPTION OF PREFERRED EMBODIMENTS

Figure 1:
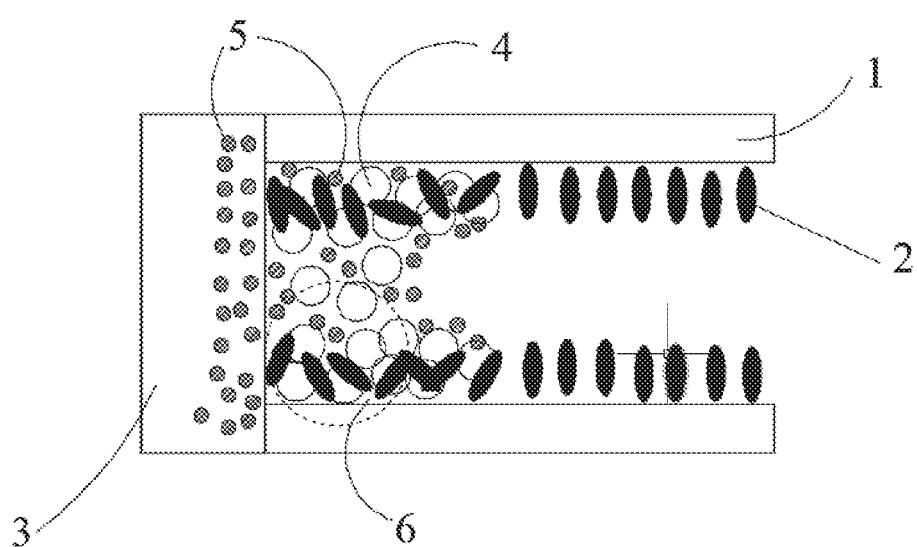
FIG. 1 is a schematic diagram showing a copolymer formed by polymerization of reaction monomers.

The following description of the various embodiments is provided to illustrate the specific embodiments.

To more clearly describe the above objects, features, and advantages of the present disclosure, the preferred embodiments of the present disclosure will be described hereinafter in details with reference to the drawings. Furthermore, it should be understood that terms such as "upper," "lower," "top," "bottom," "front," "rear," "left," "right," "inside," "outside," "lateral," "around," "central," "horizontal," "vertical," "longitudinal," "axial," "radial," "uppermost," "lowermost" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

In the drawings, the identical or similar reference numerals constantly denote the identical or similar elements or elements having the identical or similar functions.

Figure 2:
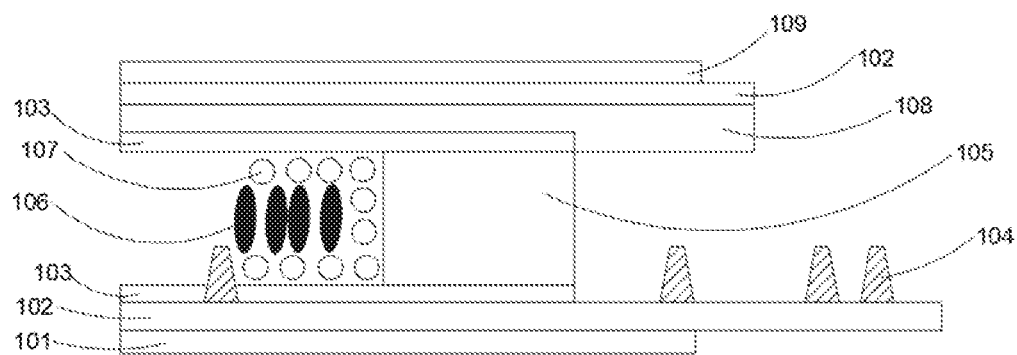
FIG. 2 is a schematic diagram showing a polymer stabilized vertical alignment liquid crystal display panel according to an embodiment of the present disclosure.

As shown in FIG. 2, FIG. 2 is a schematic diagram showing a polymer stabilized vertical alignment liquid crystal display (PS-VA LCD) panel according to an embodiment of the present disclosure. The PS-VA LCD panel includes a first substrate 103; a second substrate 103; a liquid crystal layer 106 disposed between the first substrate 103 and the second substrate 103; a plurality of vesicles 107 disposed around the liquid crystal layer 106; wherein each of the vesicles 107 includes a plurality of free radical inhibitors; a sealant 105 for encapsulating liquid crystals between the first substrate 103 and the second substrate 103. The liquid crystal layer 106 at least includes a plurality of liquid crystals and a plurality of reaction monomers polymerizable when irradiated with ultraviolet light. The sealant 105 at least includes an epoxy resin, a thermal hardener, an acrylate resin for ultraviolet curing, an ultraviolet initiator, filler, and a silane coupling agent. The PS-VA LCD panel further at least includes a bottom polarizer 101, a glass substrate 102, a sealant-retaining wall 104, an indium tin oxide (ITO) 108, and a top polarizer 109.

In a free radical chain reaction, free radical inhibitors are compounds which can react with initial free radicals to form a non-reactive radical, or are low-reactive radicals which cannot react with monomers. The free radical inhibitors can be contained in a temperature-responsive assembly vesicle. The temperature-responsive assembly vesicle will disintegrate when reaching a certain temperature to release the free radical inhibitors.

In the present embodiment, the free radical inhibitors contained in the temperature-responsive assembly vesicles containing the plurality of free radical inhibitors are a certain type of free radical inhibitor with a certain concentration. The temperature-responsive assembly vesicles are different types of temperature-responsive assembly vesicles including but not limited to at least one of N-isopropyl acrylamide, polyethylene oxide-g-1-Ethoxyethoxy-2,3-allyl glycidyl ether (PEOGMA-EE), or polyethylene oxide-g-maleic anhydride (PEOGMA-MA). The temperature-responsive assembly vesicles containing the plurality of free radical inhibitors disintegrate at temperatures ranging from 40 to 150 degrees Celsius to release the free radical inhibitors. The free radical inhibitors will prevent reaction monomers from polymerization. The free radical inhibitors include but not limited to at least one of 2,6-di-tert-butyl-4-methylphenol or tetramethylpiperidine oxynitride.

According to the PS-VA LCD panel provided by the present embodiment, a weight ratio of the vesicles containing the plurality of free radical inhibitors to the liquid crystal layer is constant. The vesicles containing the plurality of free radical inhibitors are mixed with the liquid crystals of the liquid crystal layer to form liquid suspension, and the free radical inhibitors are well contained in the vesicles.

The vesicles containing the plurality of free radical inhibitors are doped into the liquid crystal layer. Therefore, when a temperature of a sealant of the display panel reaches about 120 degrees Celsius in a heating process, the vesicles containing the plurality of free radical inhibitors disintegrate to release the free radical inhibitors, thereby suppressing polymerization of the free radicals caused by precipitation of ultraviolet inhibitors resulting from an uncured sealant. As a result, the following problems are solved: a sealant cannot be completely cured because of blockage of wirings, which leads to precipitation of ultraviolet inhibitors at a periphery of a cell, and results in polymerization of reaction monomers to form copolymers. A pretilt angle of liquid crystals will be abnormal in a location where the copolymers are formed, thereby leading to uneven brightness of the location.

The present embodiment further provides a method of manufacturing a PS-VA LCD panel, including a plurality of steps of: providing a first substrate, a second substrate, and then injecting a plurality of liquid crystals between the first substrate and the second substrate; coating a sealant on two edges of a liquid crystal layer; evenly mixing the liquid crystals and a plurality of vesicles containing a plurality of free radical inhibitors with a certain concentration and type in a dropping machine to form a mixing solution, and then evenly dropping the mixing solution around the first substrate and the second substrate; heating the sealant to 120 degrees Celsius to disintegrate the vesicles to release free radical inhibitors; and encapsulating the first substrate and the second substrate.

By using a PS-VA LCD panel manufactured by the method provided by the present embodiment, the following problems are solved: a sealant cannot be completely cured because of blockage of wirings, which leads to precipitation of ultraviolet inhibitors at a periphery of a cell, and results in polymerization of reaction monomers to form copolymers. A pretilt angle of liquid crystals will be abnormal in a location where the copolymers are formed, thereby leading to uneven brightness of the location.

The present disclosure has been shown and described with respect to one or more embodiments, and equivalents and modifications will be apparent to those skilled in the art. All such equivalents and modifications are included in the present disclosure and are only limited by the scope of the appended claims. Regarding the various functions performed by the above components, terms used to describe such components are intended to correspond to any component that performs the specified function (or functional equivalent) of the component, though structure of the any component is not the same as structure of the component of the present disclosure. Moreover, although specific features of the present disclosure have been disclosed with respect to only one of several embodiments, such features can be combined with one or more other features which are beneficial to the specific application. Furthermore, terms "comprising," "having," "containing" as well as derivate thereof which are used in embodiments or claims are intended to be included in a similar manner to the term "comprising."

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A polymer stabilized vertical alignment liquid crystal display (PS-VA LCD) panel, comprising:
   a first substrate;
   a second substrate;
   a liquid crystal layer disposed between the first substrate and the second substrate;
   a plurality of vesicles surrounding the liquid crystal layer and in contact with an outer edge of the liquid crystal layer, wherein each of the vesicles comprises a plurality of free radical inhibitors; and
   a sealant for encapsulating the liquid crystal layer between the first substrate and the second substrate;
   wherein the liquid crystal layer comprises a plurality of liquid crystals and a plurality of reaction monomers polymerizable when irradiated with ultraviolet light;
   wherein the sealant comprises an epoxy resin, a thermal hardener, an acrylate resin for ultraviolet curing, an ultraviolet initiator, filler, and a silane coupling agent;
   wherein the PS-VA LCD panel further comprises a bottom polarizer, a glass substrate, a retaining wall for blocking the sealant, an indium tin oxide (ITO) layer; and a top polarizer; and
   wherein the vesicles containing the plurality of free radical inhibitors are a plurality of temperature-responsive assembly vesicles.

2. The PS-VA LCD panel of claim 1, wherein the temperature-responsive assembly vesicles are different types of temperature-responsive assembly vesicles comprising at least one of N-isopropyl acrylamide, polyethylene oxide-g-1-Ethoxyethoxy-2,3-allyl glycidyl ether (PEOGMA-EE), or polyethylene oxide-g-maleic anhydride (PEOGMA-MA).

3. The PS-VA LCD panel of claim 2, wherein the vesicles containing the plurality of free radical inhibitors disintegrate at temperatures ranging from 40 to 150 degrees Celsius.

4. The PS-VA LCD panel of claim 1, wherein the free radical inhibitors contained in the vesicles containing the plurality of free radical inhibitors are a certain type of free radical inhibitor with a certain concentration.

5. The PS-VA LCD panel of claim 4, wherein the free radical inhibitors comprise at least one of 2,6-di-tert-butyl-4-methylphenol or tetramethylpiperidine oxynitride.

6. A polymer stabilized vertical alignment liquid crystal display (PS-VA LCD) panel, comprising:
   a first substrate;
   a second substrate;

a liquid crystal layer disposed between the first substrate and the second substrate;

a plurality of vesicles surrounding the liquid crystal layer and in contact with an outer edge of the liquid crystal layer, wherein each of the vesicles comprises a plurality of free radical inhibitors; and a sealant for encapsulating the liquid crystal layer between the first substrate and the second substrate;

wherein the liquid crystal layer comprises a plurality of liquid crystals and a plurality of reaction monomers polymerizable when irradiated with ultraviolet light;

wherein the sealant comprises an epoxy resin, a thermal hardener, an acrylate resin for ultraviolet curing, an ultraviolet initiator, filler, and a silane coupling agent; and wherein the vesicles containing the plurality of free radical inhibitors are a plurality of temperature-responsive assembly vesicles.

7. The PS-VA LCD panel of claim 6, wherein the PS-VA LCD panel further comprises a bottom polarizer, a glass substrate, a retaining wall for blocking sealant, an indium tin oxide (ITO) layer, and a top polarizer.

8. The PS-VA LCD panel of claim 6, wherein the temperature-responsive assembly vesicles are different types of temperature-responsive assembly vesicles comprising at least one of N-isopropyl acrylamide, polyethylene oxide-g-1-Ethoxyethoxy-2,3-allyl glycidyl ether (PEOGMA-EE), or polyethylene oxide-g-maleic anhydride (PEOGMA-MA).

9. The PS-VA LCD panel of claim 8, wherein the vesicles containing the plurality of free radical inhibitors disintegrate at temperatures ranging from 40 to 150 degrees Celsius.

10. The PS-VA LCD panel of claim 6, wherein the free radical inhibitors contained in the vesicles containing the plurality of free radical inhibitors are a certain type of free radical inhibitor with a certain concentration.

11. The PS-VA LCD panel of claim 10, wherein the free radical inhibitors comprise at least one of 2,6-di-tert-butyl-4-methylphenol or tetramethylpiperidine oxynitride.

\* \* \* \* \*